United States Patent
Hattori et al.

(10) Patent No.: US 10,047,859 B2
(45) Date of Patent: Aug. 14, 2018

(54) CONTROL APPARATUS FOR VEHICLE TRANSMISSION

(71) Applicant: TOYOTA JIDOSHA KABUSHIKI KAISHA, Toyota-shi, Aichi-ken (JP)

(72) Inventors: Kunio Hattori, Nagoya (JP); Daisuke Inoue, Toyota (JP); Hiroki Kondo, Miyoshi (JP); Kenji Matsuo, Toyota (JP); Mitsuhiro Fukao, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 112 days.

(21) Appl. No.: 15/313,647

(22) PCT Filed: May 27, 2015

(86) PCT No.: PCT/IB2015/000757
§ 371 (c)(1),
(2) Date: Nov. 23, 2016

(87) PCT Pub. No.: WO2015/181615
PCT Pub. Date: Dec. 3, 2015

(65) Prior Publication Data
US 2017/0114895 A1   Apr. 27, 2017

(30) Foreign Application Priority Data

May 30, 2014 (JP) ................................. 2014-113527

(51) Int. Cl.
*F16H 61/662* (2006.01)
*F16H 37/02* (2006.01)
*F16H 37/08* (2006.01)

(52) U.S. Cl.
CPC ..... *F16H 61/66259* (2013.01); *F16H 37/022* (2013.01); *F16H 37/0846* (2013.01); *F16H 61/66272* (2013.01); *F16H 2061/66277* (2013.01)

(58) Field of Classification Search
None
See application file for complete search history.

(56) References Cited

U.S. PATENT DOCUMENTS

| | | | |
|---|---|---|---|
| 2008/0119308 A1* | 5/2008 | Iwasa | F16H 61/66259 474/70 |
| 2010/0099535 A1* | 4/2010 | Matsui | F16H 1/66259 477/49 |
| 2012/0108390 A1* | 5/2012 | Doihara | B60W 10/06 477/46 |
| 2012/0310498 A1* | 12/2012 | Hattori | F16H 61/66259 701/55 |

FOREIGN PATENT DOCUMENTS

JP       S63-28740 A      2/1988

* cited by examiner

*Primary Examiner* — Justin Holmes
(74) *Attorney, Agent, or Firm* — Oliff PLC

(57) ABSTRACT

When a line pressure is dominated (determined) by at least one of a primary pressure and a secondary pressure during idling of a continuously variable transmission, the hydraulic pressure that is applied to at least one of pulleys, to which the hydraulic pressure larger than a clutch pressure is applied, is reduced. On the other hand, when the line pressure is dominated by the clutch pressure during idling of the continuously variable transmission, the speed gear ratio of the continuously variable transmission is controlled to a lowest speed gear ratio.

6 Claims, 6 Drawing Sheets

CONTROL APPARATUS FOR VEHICLE TRANSMISSION

BACKGROUND OF THE INVENTION

1. Field of the Invention

The invention relates to a control apparatus for a vehicle transmission including a continuously variable transmission mechanism and a gear mechanism that are provided in parallel with each other between a driving force source and a drive wheel.

2. Description of Related Art

There is well known a vehicle transmission including a belt-type continuously variable transmission mechanism and a gear mechanism that are provided in parallel with each other between an input rotating member and an output rotating member. The gear mechanism has a predetermined gear stage. The power of a driving force source is transmitted to the input rotating member. The output rotating member outputs the power to a drive wheel. This is, for example, a vehicle transmission described in Japanese Patent Application Publication No. 63-28740 (JP 63-28740 A). JP 63-28740 A describes a vehicle including a continuously variable transmission path and a direct drive path provided in parallel with each other between an input rotating member and an output rotating member. A continuously variable transmission is interposed in the continuously variable transmission path. The direct drive path has a fixed speed gear ratio close to the highest vehicle speed-side (highest-side) speed gear ratio (highest speed gear ratio) in the continuously variable transmission path. For example, the highest vehicle speed-side (highest-side) speed gear ratio (highest speed gear ratio) is a maximum gear ratio. In addition, JP 63-28740 A describes that, while the vehicle is traveling by using the direct drive path, a loss torque in the idling continuously variable transmission is reduced by controlling the speed gear ratio of the continuously variable transmission, which continues idling in a no-load state, to a low vehicle speed-side (low-side) optimal speed gear ratio with respect to the highest speed gear ratio. The low vehicle speed-side optimal speed gear ratio is, for example, an intermediate speed gear ratio that is the speed gear ratio "1".

SUMMARY OF THE INVENTION

Incidentally, when a speed gear ratio in the power transmission path in which the gear mechanism is interposed is lower than the lowest speed gear ratio in the power transmission path in which the continuously variable transmission mechanism is interposed, a change between the continuously variable transmission mechanism and the gear mechanism is desirably carried out at the lowest speed gear ratio side of the continuously variable transmission mechanism. In this case, when the speed gear ratio of the continuously variable transmission mechanism that is idled during transmission of power via the gear mechanism is shifted from the lowest speed gear ratio side at which the change is carried out to a higher speed gear ratio side (for example, an intermediate speed gear ratio side), the thrust (secondary thrust) of an output-side pulley of the continuously variable transmission mechanism is reduced. Therefore, a line pressure that is a source pressure of hydraulic pressure (secondary pressure) that is applied to the output-side pulley is reduced, and a loss of the driving force source for driving a hydraulic pump that generates the source pressure of the line pressure is suppressed, with the result that the effect of improving fuel economy is expected. However, the line pressure can be reduced only in a region in which the line pressure is dominated by the secondary pressure and a hydraulic pressure (primary pressure) that is applied to an input-side pulley. The region is, for example, a region in which both the secondary pressure and the primary pressure are larger than the hydraulic pressure of a clutch (clutch pressure) for establishing the power transmission path in which the gear mechanism is interposed, and the hydraulic pressure of the clutch is another control hydraulic pressure that uses the same line pressure as a source pressure. Thus, the effect of improving fuel economy is not obtained. If the speed gear ratio of the idling continuously variable transmission mechanism is shifted into a higher speed gear ratio side in a region other than the region in which the line pressure is dominated by the secondary pressure and the primary pressure, not only the effect of improving fuel economy is not obtained but also the equivalent inertia of the input rotating member increases (for example, the equivalent inertia of the input rotating member for the output-side pulley increases, and the equivalent inertia of the input rotating member depends on the speed gear ratio). Thus, for example, there is a possibility that the inertial loss of the input rotating member, resulting from rotational fluctuations during vehicle acceleration, increases and, as a result, the power performance (drivability) of the vehicle deteriorates. Thus, there is still room for improvement in how the idling continuously variable transmission mechanism is controlled. The above-described inconvenience is not publicly known.

The invention provides a control apparatus that is able to improve fuel economy or improve power performance by appropriately controlling an idling continuously variable transmission mechanism in a vehicle transmission including the continuously variable transmission and a gear mechanism that are provided in parallel with each other between an input rotating member and an output rotating member.

An aspect of the invention provides a control apparatus for a transmission of a vehicle. The transmission includes a continuously variable transmission mechanism, a gear mechanism and a clutch mechanism. The continuously variable transmission mechanism includes an input-side pulley, an output-side pulley and a belt. The belt is wound to span between the input-side pulley and the output-side pulley. The gear mechanism includes one or a plurality of gear stages. The continuously variable transmission mechanism and the gear mechanism are provided in parallel with each other between an input rotating member and an output rotating member. Power of a driving force source is transmitted to the input rotating member. The output rotating member is configured to output the power to a drive wheel. The clutch mechanism is configured to selectively change a power transmission path between a first path and a second path. The first path is a path through which the power of the driving force source is transmitted via the continuously variable transmission mechanism. The second path is a path through which the power of the driving force source is transmitted via the gear mechanism. The clutch mechanism includes a clutch configured to transmit power or interrupt transmission of power in the second path. The control apparatus includes an electronic control unit. The electronic control unit is configured to i) when at least one of an input pulley hydraulic pressure that is applied to the input-side pulley or an output pulley hydraulic pressure that is applied to the output-side pulley is larger than a clutch hydraulic pressure that is applied to the clutch while the clutch is engaged and the power of the driving force source is transmitted through the second path, control the at least one of the input pulley hydraulic pressure or the output pulley hydraulic pressure larger than the clutch hydraulic pressure such that a winding radius of the belt on the at least one of the input-side pulley or the output-side pulley, to which a hydraulic pressure larger than the clutch hydraulic pressure is applied, decreases, and ii) when the clutch hydraulic pressure is larger than any of the input pulley hydraulic pressure and the output pulley hydraulic pressure, control the input pulley hydraulic pressure and the output pulley hydraulic pressure such that a winding radius of the belt on the input-side pulley decreases and a winding radius of the belt on the output-side pulley increases.

With this configuration, when the source pressure of the hydraulic pressures that are applied to the pulleys or the clutch is dominated by at least one of the hydraulic pressure that is applied to the input-side pulley or the hydraulic pressure that is applied to the output-side pulley during idling of the continuously variable transmission mechanism, the effect of improving fuel economy is obtained by reducing the at least one of the input pulley hydraulic pressure and the output pulley hydraulic pressure, which is larger than the clutch hydraulic pressure. On the other hand, when the source pressure is dominated by the clutch hydraulic pressure during idling of the continuously variable transmission mechanism, the equivalent inertia of the input rotating member is reduced by controlling the speed gear ratio of the continuously variable transmission mechanism toward the lowest speed gear ratio. Therefore, the inertial loss of the input rotating member due to rotational fluctuations is reduced, so the power performance of the vehicle is improved. Thus, in the vehicle transmission including the continuously variable transmission mechanism and the gear mechanism that are provided in parallel with each other between the input rotating member and the output rotating member, it is possible to improve fuel economy or improve power performance by appropriately controlling the idling continuously variable transmission mechanism.

In the above aspect, the electronic control unit may be configured to, when at least one of the input pulley hydraulic pressure or the output pulley hydraulic pressure is larger than the clutch hydraulic pressure, control the input pulley hydraulic pressure and the output pulley hydraulic pressure such that the input pulley hydraulic pressure and the output pulley hydraulic pressure become corresponding minimum hydraulic pressures that do not cause a slip of the belt for an input torque to the continuously variable transmission mechanism. With this configuration, the effect of improving fuel economy is appropriately obtained by the amount of the difference between each of the minimum hydraulic pressures that do not cause a slip of the belt and a corresponding one of the input pulley hydraulic pressure and the output pulley hydraulic pressure that are respectively applied to the input-side pulley and the output-side pulley at the time of controlling the speed gear ratio of the continuously variable transmission mechanism toward the lowest speed gear ratio.

In the above aspect, the electronic control unit may be configured to, when both the minimum hydraulic pressures that do not cause a slip of the belt for the input torque to the continuously variable transmission mechanism are smaller than the clutch hydraulic pressure, control the input pulley hydraulic pressure and the output pulley hydraulic pressure while setting the clutch hydraulic pressure as a lower limit hydraulic pressure. With this configuration, it is possible to reduce the at least one of the hydraulic pressures, which is larger than the clutch hydraulic pressure, to a hydraulic pressure within a range in which one of the input pulley hydraulic pressure and the output pulley hydraulic pressure is larger than the clutch hydraulic pressure or a hydraulic pressure substantially equal to the clutch hydraulic pressure.

In the above aspect, the electronic control unit may be configured to, when the clutch hydraulic pressure is larger than any of the input pulley hydraulic pressure and the output pulley hydraulic pressure, control the input pulley hydraulic pressure and the output pulley hydraulic pressure such that a speed gear ratio of the continuously variable transmission mechanism becomes a minimum vehicle speed-side speed gear ratio. With this configuration, the equivalent inertia of the input rotating member is minimized, so the power performance of the vehicle is appropriately improved.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described in detail with reference to the accompanying drawings.

Figure 1:
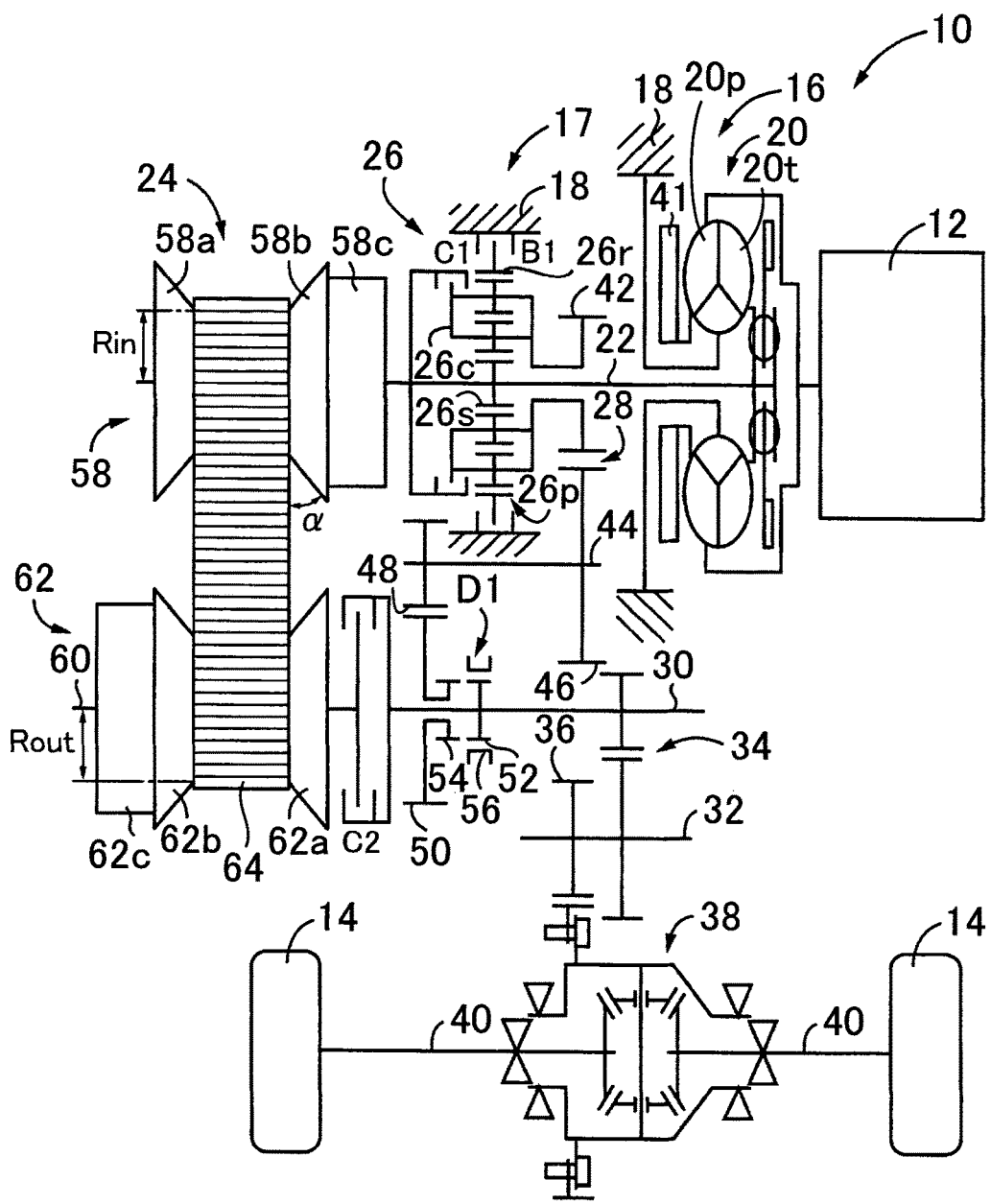
FIG. 1 is a view that illustrates the schematic configuration of a vehicle to which the invention is applied.

FIG. 1 is a view that illustrates the schematic configuration of a vehicle 10 to which the invention is applied. As shown in FIG. 1, the vehicle 10 includes an engine 12, drive wheels 14 and a power transmission system 16. The engine 12 functions as a driving force source for propelling the vehicle 10. The power transmission system 16 is provided between the engine 12 and the drive wheels 14. The power transmission system 16 includes a known torque converter 20, an input shaft 22, a known belt-type continuously variable transmission 24 (hereinafter, referred to as continuously variable transmission 24), a forward/reverse switching device 26, a gear mechanism 28, an output shaft 30, a counter shaft 32, a reduction gear unit 34, a differential gear 38, a pair of axles 40, and the like. The torque converter 20 serves as a fluid transmission device coupled to the engine 12 in a housing 18 that serves as a non-rotating member. The input shaft 22 is coupled to the torque converter 20. The continuously variable transmission 24 is coupled to the input shaft 22. The continuously variable transmission 24 serves as a continuously variable transmission mechanism. The forward/reverse switching device 26 is also coupled to the input shaft 22. The gear mechanism 28 is coupled to the input shaft 22 via the forward/reverse switching device 26. The gear mechanism 28 is provided in parallel with the continuously variable transmission 24. The gear mechanism 28 serves as a transmission mechanism. The output shaft 30 is an output rotating member common to the continuously variable transmission 24 and the gear mechanism 28. The reduction gear unit 34 is formed of a pair of gears that are respectively provided on the output shaft 30 and the counter shaft 32 so as to be relatively non-rotatable and that are in mesh with each other. The differential gear 38 is coupled to a gear 36. The gear 36 is provided on the counter shaft 32 so as to be relatively non-rotatable. The pair of axles 40 are coupled to the differential gear 38. In the thus configured power transmission system 16, the power of the engine 12 (when not specifically distinguished from one another, power is synonymous with torque and force) is transmitted to the pair of drive wheels 14 sequentially via the torque converter 20, the continuously variable transmission 24 (or the forward/reverse switching device 26 and the gear mechanism 28), the reduction gear unit 34, the differential gear 38, the axles 40, and the like.

In this way, the power transmission system 16 includes the continuously variable transmission 24 and the gear mechanism 28 in parallel with each other between the engine 12 and the drive wheels 14. The continuously variable transmission 24 and the gear mechanism 28 constitute a vehicle transmission 17 (hereinafter, referred to as transmission 17). Thus, the transmission 17 includes the input shaft 22, the output shaft 30, the continuously variable transmission 24 and the gear mechanism 28. The input shaft 22 is an input rotating member to which the power of the engine 12 is transmitted. The output shaft 30 is the output rotating member that outputs the power of the engine 12 to the drive wheels 14. The continuously variable transmission 24 and the gear mechanism 28 are provided in parallel with each other between the input shaft 22 and the output shaft 30. The transmission 17 includes a first power transmission path and a second power transmission path. The first power transmission path transmits the power of the engine 12 from the input shaft 22 toward the drive wheels 14 (that is, the output shaft 30) via the continuously variable transmission 24. The second power transmission path transmits the power of the engine 12 from the input shaft 22 toward the drive wheels 14 (that is, the output shaft 30) via the gear mechanism 28. The transmission 17 is configured to change the power transmission path between the first power transmission path and the second power transmission path on the basis of a traveling state of the vehicle 10. Therefore, the transmission 17 includes a CVT drive clutch C2, a forward clutch C1 and a reverse brake B1 as clutch mechanisms that selectively change the power transmission path, which transmits the power of the engine 12 toward the drive wheels 14, between the first power transmission path and the second power transmission path. The CVT drive clutch C2 serves as a clutch that transmits power or interrupts transmission of power in the first power transmission path. The forward clutch C1 and the reverse brake B1 serve as clutches that transmit power or interrupt transmission of power in the second power transmission path. The CVT drive clutch C2, the forward clutch C1 and the reverse brake B1 correspond to a separating device. Each of the CVT drive clutch C2, the forward clutch C1 and the reverse brake B1 is a known hydraulic friction engagement device (friction clutch) that is frictionally engaged by a hydraulic actuator. Each of the forward clutch C1 and the reverse brake B1 is one of elements that constitute the forward/reverse switching device 26 as will be described later.

The torque converter 20 is provided around the input shaft 22 coaxially with the input shaft 22. The torque converter 20 includes a pump impeller 20p and a turbine runner 20t. The pump impeller 20p is coupled to the engine 12. The turbine runner 20t is coupled to the input shaft 22. A mechanical oil pump 41 is coupled to the pump impeller 20p. The oil pump 41 generates hydraulic pressure by being rotationally driven by the engine 12. The hydraulic pressure is used to control a shift of the continuously variable transmission 24, generate a belt clamping force in the continuously variable transmission 24, change the operation of each of the clutch mechanisms, or supply lubricating oil to portions of the power transmission path of the power transmission system 16.

The forward/reverse switching device 26 is provided around the input shaft 22 coaxially with the input shaft 22. The forward/reverse switching device 26 includes a double-pinion-type planetary gear train 26p, the forward clutch C1 and the reverse brake B1. A sun gear 26s of the planetary gear train 26p is integrally coupled to the input shaft 22. A ring gear 26r of the planetary gear train 26p is selectively coupled to the housing 18 via the reverse brake B1. A carrier 26c of the planetary gear train 26p is coupled to a small-diameter gear 42. The small-diameter gear 42 is provided around the input shaft 22 coaxially with the input shaft 22 so as to be relatively rotatable. The carrier 26c and the sun gear 26s are selectively coupled to each other via the forward clutch C1. In the thus configured forward/reverse switching device 26, when the forward clutch C1 is engaged and the reverse brake B1 is released, the planetary gear train 26p is integrally rotated, the small-diameter gear 42 is rotated at the same rotation speed as the input shaft 22, and a forward power transmission path is established (achieved) in the second power transmission path. When the reverse brake B1 is engaged and the forward clutch C1 is released, the small-diameter gear 42 is rotated in a direction opposite to the rotation direction of the input shaft 22, and a reverse power transmission path is established in the second power transmission path. When both the forward clutch C1 and the reverse brake B1 are released, the second power transmission path is set to a neutral state in which transmission of power is interrupted (power transmission interrupted state).

The gear mechanism 28 includes the small-diameter gear 42 and a large-diameter gear 46. The large-diameter gear 46 is provided on a gear mechanism counter shaft 44 so as to be relatively non-rotatable. The large-diameter gear 46 is in mesh with the small-diameter gear 42. Thus, the gear mechanism 28 is a transmission mechanism having one gear stage (speed stage). An idler gear 48 is provided around the gear mechanism counter shaft 44 coaxially with the gear mechanism counter shaft 44 so as to be relatively non-rotatable. The idler gear 48 is in mesh with an output gear 50 having a larger diameter than the idler gear 48. The output gear 50 is provided around the same rotation axis as that of the output shaft 30 so as to be relatively rotatable with respect to the output shaft 30.

The transmission 17 further includes a dog clutch D1 around the output shaft 30. The dog clutch D1 selectively connects the output shaft 30 to the output gear 50 or disconnects the output shaft 30 from the output gear 50. Thus, the dog clutch D1 transmits power or interrupts transmission of power in the second power transmission path. Specifically, the dog clutch D1 includes a first gear 52, a second gear 54 and a hub sleeve 56. The first gear 52 is provided on the output shaft 30. The second gear 54 is provided integrally with the output gear 50. The hub sleeve 56 has internal teeth that are fittable (engageable, meshable) with these first gear 52 and second gear 54. In the thus configured dog clutch D1, when the hub sleeve 56 is fitted to these first gear 52 and second gear 54, the output shaft 30 and the output gear 50 are connected to each other. The dog clutch D1 includes a known synchromesh mechanism (not shown) that serves as a synchronization mechanism. The synchromesh mechanism synchronizes rotations at the time of fitting the first gear 52 to the second gear 54. When one of the forward clutch C1 and the reverse brake B1 is engaged and the dog clutch D1 is engaged, the second power transmission path is established (connected). In the second power transmission path, the power of the engine 12 is transmitted from the input shaft 22 to the output shaft 30 sequentially via the forward/reverse switching device 26, the gear mechanism 28, the idler gear 48 and the output gear 50.

The continuously variable transmission 24 is provided in a power transmission path between the input shaft 22 and the output shaft 30. The continuously variable transmission 24 includes an input-side pulley (hereinafter, referred to as primary pulley) 58, an output-side pulley (hereinafter, referred to as secondary pulley) 62 and a transmission belt 64. The primary pulley 58 is an input-side rotating member provided on the input shaft 22, and is a drive pulley having a variable effective diameter. The secondary pulley 62 is an output-side rotating member provided on a rotary shaft 60 coaxial with the output shaft 30, and is a driven pulley having a variable effective diameter. The transmission belt 64 is a belt wound to span between those pulleys 58, 62. Power is transmitted via a friction force between those pulleys 58, 62 and the transmission belt 64.

Figure 3:
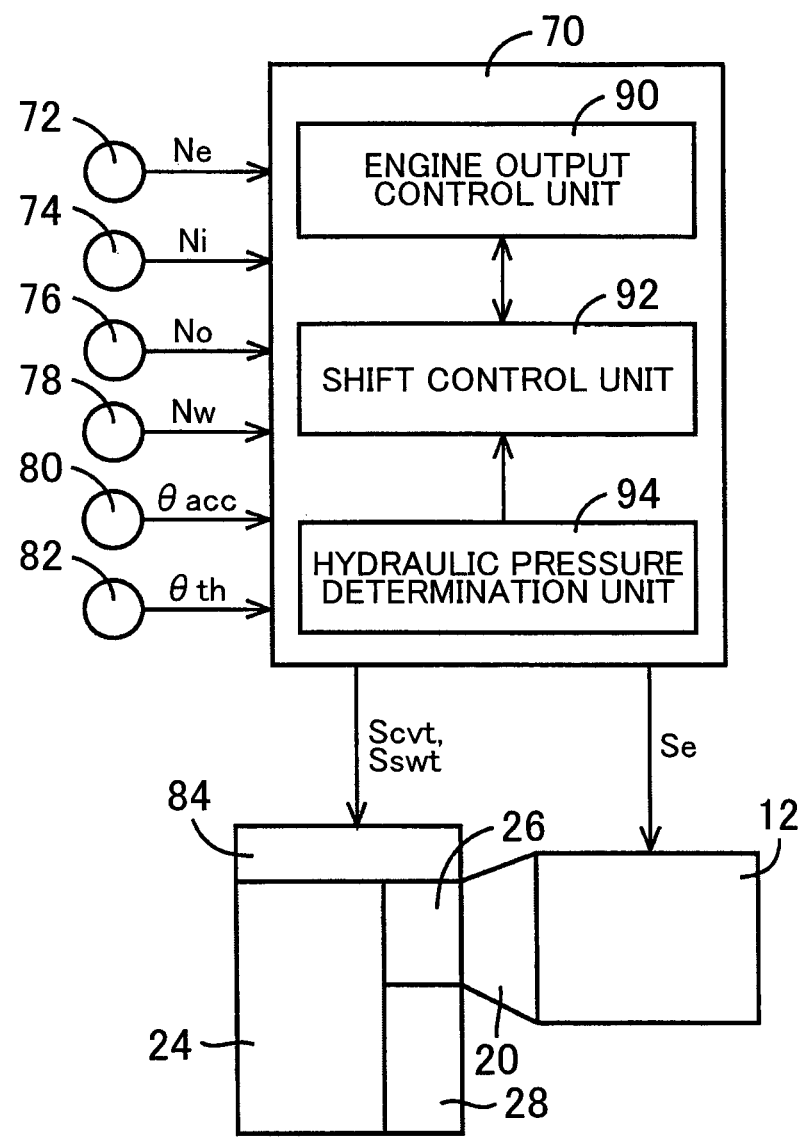
FIG. 3 is a view that illustrates a relevant portion of control functions and control system for various controls in the vehicle.

In the primary pulley 58, an input-side thrust (primary thrust) Win (=Primary pressure Pin×Pressure receiving area) in the primary pulley 58 for changing a V-groove width between sheaves 58a, 58b is controlled by regulating a hydraulic pressure that is applied to the primary pulley 58 (that is, a primary pressure Pin that is supplied to a primary hydraulic cylinder 58c) by using a hydraulic control circuit 84 (see FIG. 3). In the secondary pulley 62, an output-side thrust (secondary thrust) Wout (=Secondary pressure Pout× Pressure receiving area) in the secondary pulley 62 for changing a V-groove width between sheaves 62a, 62b is controlled by regulating a hydraulic pressure that is applied to the secondary pulley 62 (that is, a secondary pressure Pout that is supplied to a secondary hydraulic cylinder 62c) by using the hydraulic control circuit 84. When the primary thrust Win and the secondary thrust Wout each are controlled, the V-groove width of each of the pulleys 58, 62 changes, with the result that the winding diameter (effective diameter) of the transmission belt 64 is changed. When the winding diameter of the transmission belt 64 is changed, a speed gear ratio (gear ratio) γ (=Input shaft rotation speed Ni/Output shaft rotation speed No) is continuously changed, and a friction force (belt clamping force) between each of the pulleys 58, 62 and the transmission belt 64 is controlled such that a slip of the transmission belt 64 does not occur. In this way, when the primary thrust Win and the secondary thrust Wout each are controlled, an actual speed gear ratio γ is set to a target speed gear ratio γtgt while a slip of the transmission belt 64 is prevented.

For example, when the V-groove width of the primary pulley 58 is reduced by increasing the primary pressure Pin, the speed gear ratio γ of the continuously variable transmission 24 decreases (that is, the continuously variable transmission 24 upshifts). For example, when the V-groove width of the primary pulley 58 is increased by reducing the primary pressure Pin, the speed gear ratio γ increases (that is, the continuously variable transmission 24 downshifts). Thus, for example, when the V-groove width of the primary pulley 58 is minimum, a minimum speed gear ratio (maximum vehicle speed-side speed gear ratio, highest speed gear ratio) γmin is established as the speed gear ratio γ of the continuously variable transmission 24. For example, when the V-groove width of the primary pulley 58 is maximum, a maximum speed gear ratio (minimum vehicle speed-side speed gear ratio, lowest speed gear ratio) γmax is established as the speed gear ratio γ of the continuously variable transmission 24. The target speed gear ratio γtgt is achieved by the correlation between the primary thrust Win and the secondary thrust Wout while a slip of the transmission belt 64 (belt slip) is prevented by the primary pressure Pin (which is synonymous with the primary thrust Win) and the secondary pressure Pout (which is synonymous with the secondary thrust Wout). A target speed gear ratio is not achieved by one of the pulley pressures (which are synonymous with thrusts) only.

The CVT drive clutch C2 is provided on the drive wheels 14 side with respect to the continuously variable transmission 24 (that is, the CVT drive clutch C2 is provided between the secondary pulley 62 and the output shaft 30). The CVT drive clutch C2 selectively connects the secondary pulley 62 (rotary shaft 60) to the output shaft 30 or disconnects the secondary pulley 62 (rotary shaft 60) from the output shaft 30. When the CVT drive clutch C2 is engaged, the first power transmission path is established (connected). In the first power transmission path, the power of the engine 12 is transmitted from the input shaft 22 to the output shaft 30 via the continuously variable transmission 24.

Figure 2:
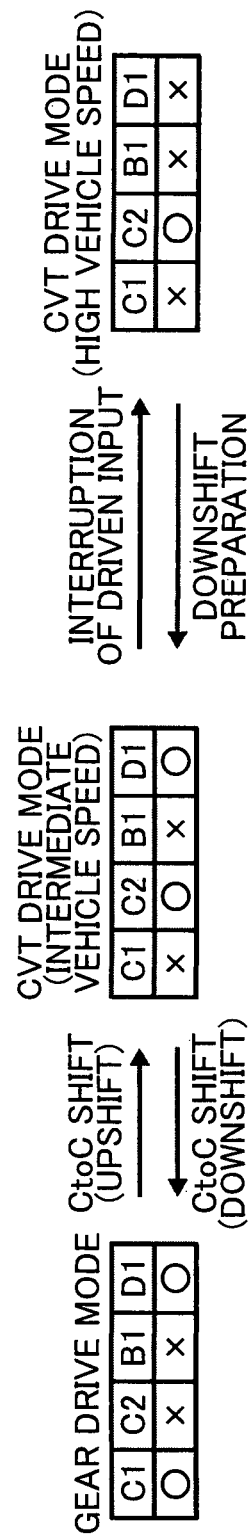
FIG. 2 is a view for illustrating changes in driving pattern of a vehicle transmission.

The operation of the transmission 17 will be described below. FIG. 2 is a view for illustrating changes in driving pattern of the transmission 17 by using an engagement chart of engagement elements for each driving pattern. In FIG. 2, C1 corresponds to the operation state of the forward clutch C1, C2 corresponds to the operation state of the CVT drive clutch C2, B1 corresponds to the operation state of the reverse brake B1, D1 corresponds to the operation state of the dog clutch D1, "O" indicates an engaged (connected) state, and "x" indicates a released (disconnected) state.

Initially, a gear drive mode (also referred to as gear transmission mode) that is the driving pattern in which the power of the engine 12 is transmitted to the output shaft 30 via the gear mechanism 28 (that is, the driving pattern in which the power transmission path is changed to the second power transmission path) will be described. In this gear drive mode, as shown in FIG. 2, for example, the forward clutch C1 and the dog clutch D1 are engaged, while the CVT drive clutch C2 and the reverse brake B1 are released.

Specifically, when the forward clutch C1 is engaged, the planetary gear train 26p is integrally rotated at the same rotation speed as the input shaft 22, so the mechanically coupled gear mechanism 28, gear mechanism counter shaft 44, idler gear 48 and output gear 50 are also rotated. Because the output gear 50 and the first gear 52 are connected to each other by engagement of the dog clutch D1, the output shaft 30 provided integrally with the first gear 52 is rotated. In this way, when the forward clutch C1 and the dog clutch D1 are engaged, the power of the engine 12 is transmitted to the output shaft 30 sequentially via the torque converter 20, the forward/reverse switching device 26, the gear mechanism 28, and the like. In this gear drive mode, for example, when the reverse brake B1 and the dog clutch D1 are engaged, and the CVT drive clutch C2 and the forward clutch C1 are released, reverse traveling is enabled.

Subsequently, a CVT drive mode (also referred to as CVT transmission mode) that is the driving pattern in which the power of the engine 12 is transmitted to the output shaft 30 via the continuously variable transmission 24 (that is, the driving pattern in which the power transmission path is changed to the first power transmission path) will be described. In this CVT drive mode, as shown in the CVT drive mode (high vehicle speed) of FIG. 2, for example, the CVT drive clutch C2 is engaged, while the forward clutch C1, the reverse brake B1 and the dog clutch D1 are released.

Specifically, when the CVT drive clutch C2 is engaged, the rotary shaft 60 and the output shaft 30 are connected to each other, so the secondary pulley 62 and the output shaft 30 are integrally rotated. In this way, when the CVT drive clutch C2 is engaged, the power of the engine 12 is transmitted to the output shaft 30 sequentially via the torque converter 20, the continuously variable transmission 24, and the like. The reason why the dog clutch D1 is released in the CVT drive mode (high vehicle speed) is to, for example, eliminate a drag of the gear mechanism 28, and the like, in the CVT drive mode and prevent high-speed rotation of the gear mechanism 28, and the like, at a high vehicle speed.

The gear drive mode is, for example, selected in a low vehicle speed region including a state during a stop of the vehicle. A speed gear ratio $\gamma 1$ (that is a speed gear ratio EL that is established by the gear mechanism 28) in this second power transmission path is set to a speed gear ratio lower than the lowest speed gear ratio $\gamma max$ that is established by the continuously variable transmission 24. For example, the speed gear ratio $\gamma 1$ corresponds to a first-speed speed gear ratio $\gamma 1$ that is the speed gear ratio of a first gear stage in the transmission 17, and the lowest speed gear ratio $\gamma max$ of the continuously variable transmission 24 corresponds to a second-speed speed gear ratio $\gamma 2$ that is the speed gear ratio of a second gear stage in the transmission 17. Therefore, for example, the gear drive mode and the CVT drive mode are changed in accordance with a shift line for changing between the first gear stage and the second gear stage in a shift map of a known stepped transmission. For example, in the CVT drive mode, a shift (for example, a CVT shift, a continuously variable shift) is carried out. In this shift, the speed gear ratio $\gamma$ is changed on the basis of a traveling state, such as an accelerator operation amount $\theta acc$ and a vehicle speed V, by using a known method. In changing the driving pattern from the gear drive mode to the CVT drive mode (high vehicle speed) or changing the driving pattern from the CVT drive mode (high vehicle speed) to the gear drive mode, the change is carried out via a CVT drive mode (intermediate vehicle speed) shown in FIG. 2 transitionally.

For example, when the driving pattern is changed from the gear drive mode to the CVT drive mode (high vehicle speed), the driving pattern is transitionally changed from the gear drive mode to the CVT drive mode (intermediate vehicle speed). The gear drive mode is the state where the forward clutch C1 and the dog clutch D1 are engaged. The CVT drive mode (intermediate vehicle speed) is the state where the CVT drive clutch C2 and the dog clutch D1 are engaged. That is, a clutch engagement changing shift (for example, clutch-to-clutch shift (hereinafter, referred to as CtoC shift)) is carried out so as to release the forward clutch C1 and engage the CVT drive clutch C2. At this time, the power transmission path is changed from the second power transmission path to the first power transmission path, and the transmission 17 is substantially upshifted. After the power transmission path is changed, the dog clutch D1 is released in order to prevent an unnecessary drag or high-speed rotation of the gear mechanism 28, or the like (see interruption of driven input in FIG. 2). In this way, the dog clutch D1 functions as a driven input interrupting clutch that interrupts input from the drive wheels 14 side.

For example, when the driving pattern is changed from the CVT drive mode (high vehicle speed) to the gear drive mode, the driving pattern is transitionally changed from the CVT drive mode (high vehicle speed) to the CVT drive mode (intermediate vehicle speed) in preparation for changing the driving pattern to the gear drive mode (see downshift preparation in FIG. 2). The CVT drive mode (high vehicle speed) is the state where the CVT drive clutch C2 is engaged. The CVT drive mode (intermediate vehicle speed) is the state where the CVT drive clutch C2 is engaged and the dog clutch D1 is further engaged. In the CVT drive mode (intermediate vehicle speed), rotation is also transmitted to the carrier 26c of the planetary gear train 26p via the gear mechanism 28. When a clutch engagement changing shift (for example, CtoC shift) is carried out so as to release the CVT drive clutch C2 and engage the forward clutch C1 from the state of the CVT drive mode (intermediate vehicle speed), the driving pattern is changed to the gear drive mode. At this time, the power transmission path is changed from the first power transmission path to the second power transmission path, and the transmission 17 is substantially downshifted.

FIG. 3 is a view that illustrates a relevant portion of control functions and control system for various controls in the vehicle 10. As shown in FIG. 3, the vehicle 10 includes an electronic control unit (ECU) 70 including, for example, a control unit for the vehicle 10. The control unit changes the driving pattern of the transmission 17. Thus, FIG. 3 is a view that shows input/output lines of the electronic control unit 70, and is a functional block diagram that illustrates a relevant portion of control functions implemented by the electronic control unit 70. The electronic control unit 70 includes a so-called microcomputer. The microcomputer includes, for example, a CPU, a RAM, a ROM, input/output interfaces, and the like. The CPU executes various controls over the vehicle 10 by executing signal processing in accordance with programs prestored in the ROM while utilizing a temporary storage function of the RAM. For example, the electronic control unit 70 is configured to execute output control over the engine 12, shift control and belt clamping force control over the continuously variable transmission 24, control for changing the driving pattern of the transmission 17, and the like. Where necessary, the electronic control unit 70 is split into an electronic control unit for controlling the engine, an electronic control unit for controlling a shift, and the like.

Various actual values based on detection signals of various sensors of the vehicle 10 are supplied to the electronic control unit 70. The various sensors include, for example, various rotation speed sensors 72, 74, 76, 78, an accelerator operation amount sensor 80, a throttle valve opening degree sensor 82, and the like. The various actual values include, for example, an engine rotation speed Ne, an input shaft rotation speed Ni, an output shaft rotation speed No, a wheel speed Nw, an accelerator operation amount $\theta acc$, a throttle valve opening degree $\theta th$, and the like. The input shaft rotation speed Ni is the rotation speed of the input shaft 22, and corresponds to an angular velocity (input shaft angular velocity) $\omega i$ of the input shaft 22 (primary pulley 58). The output shaft rotation speed No is the rotation speed of the rotary shaft 60, and corresponds to an angular velocity (output shaft angular velocity) $\omega oo$ of the rotary shaft 60 (secondary pulley 62). The wheel speed Nw is the rotation speed of one of the drive wheels 14, and corresponds to the vehicle speed V. The accelerator operation amount θacc is the operation amount of an accelerator pedal as a driver's acceleration request amount. The electronic control unit 70, for example, calculates the actual speed gear ratio γ of the continuously variable transmission 24 on the basis of the output shaft rotation speed No and the input shaft rotation speed Ni.

An engine output control command signal Se, a hydraulic control command signal Scvt, a hydraulic control command signal Sswt, and the like, are output from the electronic control unit 70. The engine output control command signal Se is used to control the output of the engine 12. The hydraulic control command signal Scvt is used to control hydraulic pressure associated with a shift of the continuously variable transmission 24. The hydraulic control command signal Sswt is used to control the forward/reverse switching device 26, the CVT drive clutch C2 and the dog clutch D1 associated with a change of the driving pattern of the transmission 17. For example, a command signal for driving a solenoid valve that regulates the primary pressure Pin, a command signal for driving a solenoid valve that regulates the secondary pressure Pout, a command signal for driving a solenoid valve that controls a line pressure P1, and the like, are output to the hydraulic control circuit 84 as the hydraulic control command signal Scvt. Command signals, and the like, for respectively driving solenoid valves that regulate hydraulic pressures that are applied to the forward clutch C1, the reverse brake B1, the CVT drive clutch C2 and the dog clutch D1 are output to the hydraulic control circuit 84 as the hydraulic control command signal Sswt. The hydraulic pressures that are applied to the forward clutch C1, the reverse brake B1, the CVT drive clutch C2 and the dog clutch D1 are a clutch pressure Pc1, a clutch pressure Pb1, a clutch pressure Pc2 and a clutch pressure Pd1 that are respectively supplied to actuators of the forward clutch C1, the reverse brake B1, the CVT drive clutch C2 and the dog clutch D1.

In the hydraulic control circuit 84, the line pressure P1 is a hydraulic pressure that is a source pressure in regulating the primary pressure Pin, the secondary pressure Pout, the clutch pressure Pc1, the clutch pressure Pb1, the clutch pressure Pc2, the clutch pressure Pd1, or the like. The line pressure P1 is, for example, regulated by a solenoid valve by using a hydraulic oil pressure that is output from (generated by) an oil pump 41. The line pressure P1 is, for example, regulated to a hydraulic pressure that is obtained by adding a predetermined margin to the highest hydraulic pressure among the primary pressure Pin, the secondary pressure Pout, the clutch pressure Pc1, the clutch pressure Pb1, the clutch pressure Pc2, the clutch pressure Pd1, and the like. Thus, a shortage of the line pressure P1 that is the source pressure is avoided in regulating the hydraulic pressures, and an unnecessarily high line pressure P1 is avoided. In the hydraulic control circuit 84, for example, the primary pressure Pin and the secondary pressure Pout are controlled so as to cause the pulleys 58, 62 to generate such belt clamping forces that do not cause a belt slip or do not unnecessarily increase. Because of the correlation between the primary pressure Pin and the secondary pressure Pout, the speed gear ratio γ of the continuously variable transmission 24 is changed as a result of a change in a thrust ratio τ between the pulleys 62, 58 (=Wout/Win). For example, as the thrust ratio τ is increased, the speed gear ratio γ increases (that is, the continuously variable transmission 24 downshifts).

The electronic control unit 70 includes engine output control means, that is, an engine output control unit 90, and shift control means, that is, a shift control unit 92.

The engine output control unit 90, for example, outputs the engine output control command signal Se to the throttle actuator, the fuel injection device and the ignition device in order to control the output of the engine 12. The engine output control unit 90, for example, calculates a required driving force Fdem as a driver's driving request amount on the basis of the actual accelerator operation amount θacc and the actual vehicle speed V by using a correlation (driving force map) (not shown) empirically obtained or obtained by design and stored in advance (that is, predetermined). The engine output control unit 90 sets a target engine torque Tetgt for obtaining the required driving force Fdem. The engine output control unit 90 controls not only the open/close of the electronic throttle valve by the throttle actuator but also the fuel injection amount by the fuel injection device and the ignition timing by the ignition device such that the target engine torque Tetgt is obtained. Not only the required driving force Fdem [N] of the drive wheels 14 but also a required driving torque [Nm] of the drive wheels 14, a required driving power [W] of the drive wheels 14, and the like, may be used as the driving request amount. The accelerator operation amount θacc[%], the throttle valve opening degree θth[%], an intake air amount [g/sec] of the engine 12, or the like, may be simply used as the driving request amount.

In the CVT drive mode, the shift control unit 92, for example, carries out a CVT shift by outputting a primary command pressure Pindir and a secondary command pressure Poutdir to the hydraulic control circuit 84 as the hydraulic control command signal Scvt such that the target speed gear ratio γtgt of the continuously variable transmission 24 is achieved while a belt slip of the continuously variable transmission 24 does not occur. The primary command pressure Pindir is a command value of the primary pressure Pin. The secondary command pressure Poutdir is a command value of the secondary pressure Pout.

Figure 4:
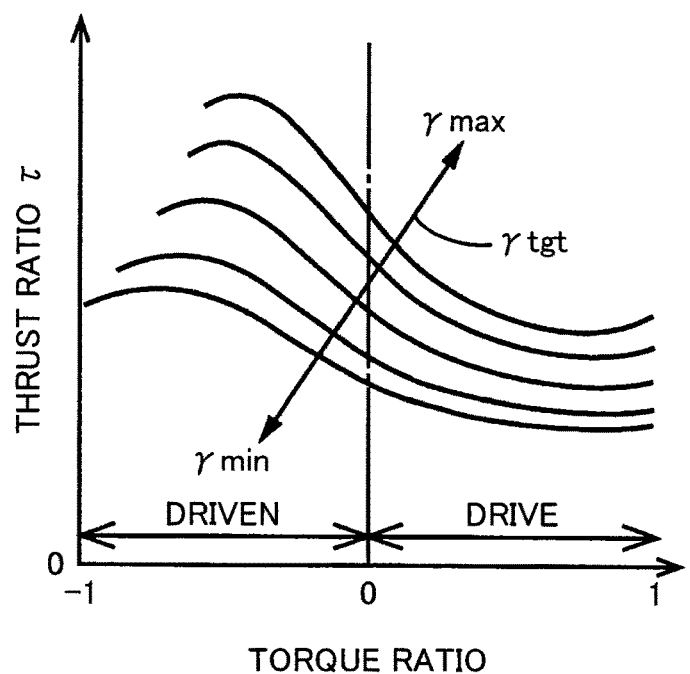
FIG. 4 is a graph that shows an example of a thrust ratio map determined in advance between a torque ratio and a thrust ratio with a target speed gear ratio as a parameter.
Figure 5:
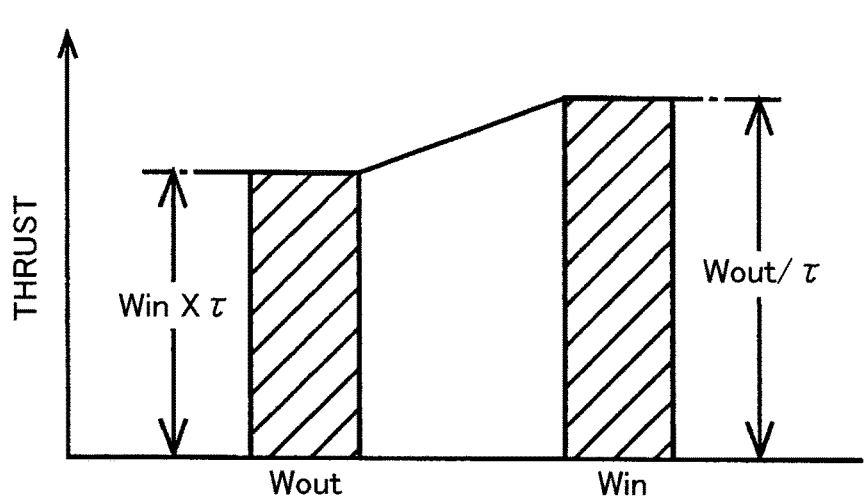
FIG. 5 is a graph for illustrating thrusts that are required to keep a target speed gear ratio.

Specifically, the shift control unit 92 calculates a target input shaft rotation speed Nitgt on the basis of the accelerator operation amount θacc and the vehicle speed V by consulting a predetermined known correlation (for example, a CVT shift map). The shift control unit 92 calculates a target speed gear ratio γtgt (=Nitgt/No) on the basis of the target input shaft rotation speed Nitgt. The shift control unit 92 calculates an estimated value of the engine torque Te on the basis of the throttle valve opening degree θth and the engine rotation speed Ne by consulting a predetermined known correlation (for example, an engine torque map). The shift control unit 92 calculates an input torque Tin of the continuously variable transmission 24 on the basis of the engine torque Te and the characteristic of the torque converter 20. The shift control unit 92 calculates a thrust ratio τ for steadily keeping the target speed gear ratio γtgt on the basis of the target speed gear ratio γtgt and a torque ratio by consulting a predetermined correlation (thrust ratio map) shown in FIG. 4. The torque ratio is the ratio of the calculated input torque Tin to a limit input torque Tlmtin (=Tin/Tlmtin). The limit input torque Tlmtin is a predetermined limit torque that is allowed to be input to the continuously variable transmission 24. The shift control unit 92 calculates a target secondary thrust Wouttgt and a target primary thrust Wintgt for achieving the thrust ratio τ. As shown in FIG. 5, when one of the thrusts is determined, the other thrust is also determined on the basis of the thrust ratio τ that achieves the target speed gear ratio γtgt. The shift control unit 92 converts the target secondary thrust Wouttgt to a target secondary pressure Pouttgt Wouttgt/Pressure receiving area of hydraulic cylinder 62c) on the basis of the pressure receiving area of the hydraulic cylinder 62c. The shift control unit 92 converts the target primary thrust Wintgt to a target primary pressure Pintgt (=Wintgt/Pressure receiving area of hydraulic cylinder 58c) on the basis of the pressure receiving area of the hydraulic cylinder 58c. The shift control unit 92 outputs the primary command pressure Pindir and the secondary command pressure Poutdir as the hydraulic control command signal Scvt to the hydraulic control circuit 84 such that the target primary pressure Pintgt and the target secondary pressure Pouttgt are obtained. The hydraulic control circuit 84 regulates the primary pressure Pin and the secondary pressure Pout by operating the corresponding solenoid valves in accordance with the hydraulic control command signal Scvt. In the above description of the CVT shift, for the sake of convenience of description, a thrust (for example, a balance thrust) for keeping the target speed gear ratio γtgt constant is described; however, in a transition of shift, a thrust (for example, a shift differential thrust (which can be a positive value or a negative value)) for achieving a target upshift or downshift is added to the balance thrust. That is, the above CVT shift describes the case of shift control at the time when the shift differential thrust is set to zero.

In calculating the target secondary thrust Wouttgt and the target primary thrust Wintgt, a belt slip limit thrust (hereinafter, referred to as slip limit thrust) Wlmt is considered. The slip limit thrust Wlmt is a thrust (required thrust) that is required to prevent a belt slip with a necessary minimum thrust, that is, a thrust just before a belt slip occurs. For example, the shift control unit 92 calculates a secondary shift control thrust Woutsh on the basis of a primary slip limit thrust Wlmtin and a thrust ratio τ that achieves the target speed gear ratio γtgt. The primary slip limit thrust Wlmtin is a primary pulley 58-side slip limit thrust. The secondary shift control thrust Woutsh is a secondary pulley 62-side thrust that is required for shift control. The shift control unit 92 sets the target secondary thrust Wouttgt to a larger one of a secondary slip limit thrust Wlmtout and the calculated secondary shift control thrust Woutsh. The secondary slip limit thrust Wlmtout is a secondary pulley 62-side slip limit thrust. The shift control unit 92 calculates the target primary thrust Wintgt on the basis of the target secondary thrust Wouttgt and the thrust ratio τ. The primary slip limit thrust Wlmtin is calculated by the shift control unit 92 through the following mathematical expression (1) on the basis of the input torque Tin of the continuously variable transmission 24, the sheave angle (coned face angle) α of the primary pulley 58, a predetermined belt element-sheave friction coefficient μ and a primary pulley 58-side belt winding radius Rin (see FIG. 1). The input torque Tin of the continuously variable transmission 24 is the input torque of the primary pulley 58. The primary pulley 58-side belt winding radius Rin is uniquely calculated from an actual speed gear ratio γ. The secondary slip limit thrust Wlmtout is calculated by the shift control unit 92 through the following mathematical expression (2) on the basis of an output torque Tout (=γ×Tin) of the continuously variable transmission 24, the sheave angle (coned face angle) α of the secondary pulley 62, the predetermined belt element-sheave friction coefficient and a secondary pulley 62-side belt winding radius Rout (see FIG. 1). The output torque Tout of the continuously variable transmission 24 is the input torque of the secondary pulley 62. The secondary pulley 62-side belt winding radius Rout is uniquely calculated from the actual speed gear ratio γ.

$$Wlmtin=(Tin \times \cos \alpha)/(2 \times \mu \times Rin) \quad (1)$$

$$Wlmtout=(Tout \times \cos \alpha)/(2 \times \mu \times Rout) \quad (2)$$

The shift control unit 92 executes change control for changing the driving pattern between the gear drive mode and the CVT drive mode. Specifically, the shift control unit 92 determines whether to change the driving pattern in which the vehicle is traveling. For example, the shift control unit 92 determines whether to shift (change the speed gear ratio) on the basis of the vehicle speed V and the accelerator operation amount θacc by using an upshift line and a downshift line for changing the speed gear ratio between the first-speed speed gear ratio γ1 and the second-speed speed gear ratio γ2. The shift control unit 92 determines whether to change the driving pattern in which the vehicle is traveling on the basis of the determined result. The first-speed speed ratio corresponds to the speed gear ratio EL in the gear drive mode. The second-speed speed gear ratio corresponds to the lowest speed gear ratio γmax in the CVT drive mode. The upshift line and the downshift line are, for example, predetermined shift lines, and have a predetermined hysteresis.

When the shift control unit 92 determines to change the driving pattern, the shift control unit 92 changes the driving pattern. For example, when the shift control unit 92 determines to upshift in the gear drive mode, the shift control unit 92 changes the driving pattern from the gear drive mode to the CVT drive mode (high vehicle speed). When the shift control unit 92 changes the driving pattern from the gear drive mode to the CVT drive mode (high vehicle speed), the shift control unit 92 initially carries out an upshift through a CtoC shift for releasing the forward clutch C1 and engaging the CVT drive clutch C2. This state corresponds to the CVT drive mode (intermediate vehicle speed) to which the driving pattern is transitionally changed in FIG. 2. The power transmission path in the transmission 17 is changed from the second power transmission path, through which power is transmitted via the gear mechanism 28, to the first power transmission path, through which power is transmitted via the continuously variable transmission 24. Subsequently, the shift control unit 92 changes the driving pattern to the CVT drive mode (high vehicle speed) by outputting a command to actuate the hub sleeve 56 such that the engaged dog clutch D1 is released. The hub sleeve 56 is driven by the hydraulic actuator (not shown), and a pressing force that is applied to the hub sleeve 56 is adjusted by a hydraulic pressure that is supplied to the hydraulic actuator. In the CVT drive mode, the shift control unit 92, for example, sets a target clutch pressure Pc2tgt to a hydraulic pressure to such an extent that the torque capacity of the CVT drive clutch C2 is larger than a transmitted torque according to the input torque Tin that is required to be transmitted in the first power transmission path. The shift control unit 92 outputs a clutch command pressure Pc2dir as the hydraulic control command signal Sswt to the hydraulic control circuit 84 such that the target clutch pressure Pc2tgt is obtained. The hydraulic control circuit 84 regulates the clutch pressure Pc2 by operating the corresponding solenoid valve in accordance with the hydraulic control command signal Sswt.

When the shift control unit 92 determines to downshift in the CVT drive mode (high vehicle speed), the shift control unit 92 changes the driving pattern from the CVT drive mode (high vehicle speed) to the gear drive mode. When the shift control unit 92 changes the driving pattern from the CVT drive mode (high vehicle speed) to the gear drive mode, the shift control unit 92 initially changes the driving pattern to the CVT drive mode (intermediate vehicle speed) by outputting a command to actuate the hub sleeve 56 such that the released dog clutch D1 is engaged. Subsequently, the shift control unit 92 carries out a downshift through a CtoC shift for releasing the CVT drive clutch C2 and engaging the forward clutch C1. This state corresponds to the gear drive mode in FIG. 2. The power transmission path in the transmission 17 is changed from the first power transmission path, through which power is transmitted via the continuously variable transmission 24, to the second power transmission path, through which power is transmitted via the gear mechanism 28. In this way, when the shift control unit 92 changes transmission of power from transmission of power via the continuously variable transmission 24 to transmission of power via the gear mechanism 28 while the vehicle 10 is traveling, the dog clutch D1 is actuated to an engaged side and then the CVT drive clutch C2 is released. In the gear drive mode, the shift control unit 92, for example, sets a target clutch pressure Pc1$tgt$ to a hydraulic pressure to such an extent that the torque capacity of the forward clutch C1 is larger than a transmitted torque according to the input torque Tin that is required to be transmitted in the second power transmission path. The shift control unit 92 outputs a clutch command pressure Pc1$dir$ as the hydraulic control command signal Sswt to the hydraulic control circuit 84 such that the target clutch pressure Pc1$tgt$ is obtained. The hydraulic control circuit 84 regulates the clutch pressure Pc1 by operating the corresponding solenoid valve in accordance with the hydraulic control command signal Sswt.

In control for transitionally changing the driving pattern to the CVT drive mode (intermediate vehicle speed) as described above, the first power transmission path and the second power transmission path are changed only by exchanging torque through a CtoC shift. Therefore, a change shock is suppressed.

Figure 6:
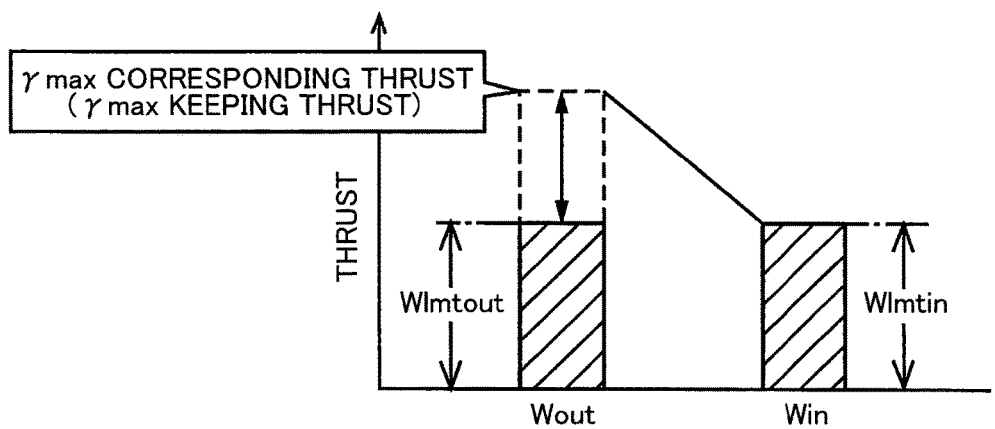
FIG. 6 is a graph that shows an example of a thrust for keeping the lowest speed gear ratio and slip limit thrusts.

Incidentally, in the gear drive mode, the continuously variable transmission 24 idles with rotation of the primary pulley 58 coupled to the input shaft 22 in a state where the rotary shaft 60 is separated from the output shaft 30. On one hand, in terms of continuity in a change from the gear drive mode to the CVT drive mode, it is conceivable that the speed gear ratio γ of the continuously variable transmission 24 is, for example, controlled to the lowest speed gear ratio γmax during idling of the continuously variable transmission 24. On the other hand, in the gear drive mode, no torque is transmitted via the continuously variable transmission 24, so belt clamping pressures (the primary pressure Pin and the secondary pressure Pout) just need to be ensured to such an extent that no belt slip occurs for the input torque Tin during idling of the continuously variable transmission 24. Thus, as shown in FIG. 6, during idling of the continuously variable transmission 24, the secondary thrust Wout is reduced as compared to a thrust for keeping the lowest speed gear ratio γmax within the range in which the secondary slip limit thrust Wlmtout is ensured. Thus, the line pressure P1 that is the source pressure of the secondary pressure Pout is reduced, and a loss of the engine 12 that drives the oil pump 41 for generating the source pressure of the line pressure P1 is suppressed, so the effect of improving fuel economy is expected.

However, as described above, the line pressure P1 in the gear drive mode depends on not only the primary pressure Pin and the secondary pressure Pout but also the clutch pressure Pc1 (in the case of reverse traveling, the clutch pressure Pb1). Therefore, depending on the magnitude of the input torque Tin, the clutch pressure Pc1 can be increased, and the line pressure P1 can be dominated (set) by the clutch pressure Pc1. In such a case, the line pressure P1 is not reduced no matter how much the primary pressure Pin or the secondary pressure Pout is reduced, and the effect of improving fuel economy is not obtained. As shown in FIG. 6, when the secondary thrust Wout is reduced, the speed gear ratio γ of the continuously variable transmission 24 is controlled from the lowest speed gear ratio γmax toward a higher speed gear ratio, so an input shaft equivalent inertia Iin [kgm²] in the continuously variable transmission 24 increases (see the following mathematical expression (3)). When the continuously variable transmission 24 is controlled from the lowest speed gear ratio γmax to a higher speed gear ratio in the case where the line pressure P1 is dominated (set) by the clutch pressure Pc1, not only the effect of improving fuel economy is not obtained but also, for example, during vehicle acceleration, an input shaft inertial loss Tli [Nm] due to fluctuations in rotation of the input shaft 22 increases (see the following mathematical expression (4)). Thus, there is a possibility that the power performance (drivability) of the vehicle 10 deteriorates. In the following mathematical expressions (3), (4), Igear denotes the input shaft equivalent inertia [kgm²] along the first power transmission path, Isec denotes the inertia [kgm²] of the secondary pulley 62, γ denotes the speed gear ratio of the continuously variable transmission 24, (Isec/γ²) denotes the input shaft equivalent inertia [kgm²] of the secondary pulley 62, ωi denotes the input shaft angular velocity [rad/s], and (dωi/dt) denotes an input shaft angular acceleration [rad/s²], that is, a time rate of change in rotation speed of the input shaft 22.

$$I\text{in}=I\text{gear}+(I\text{sec}/\gamma^2) \tag{3}$$

$$T\text{li}=I\text{in}\times(d\omega i/dt) \tag{4}$$

When the forward clutch C1 (in the case of reverse traveling, the reverse brake B1) is engaged and the power of the engine 12 is being transmitted through the second power transmission path (that is, during idling of the continuously variable transmission 24), and when at least one of the primary pressure Pin and the secondary pressure Pout is larger than the clutch pressure Pc1 (in the case of reverse traveling, the clutch pressure Pb1), the electronic control unit 70 controls the hydraulic pressure larger than the clutch pressure Pc1 such that the winding radius (that is, the belt winding radius R) of the transmission belt 64 on at least one of the pulleys, to which the hydraulic pressure larger than the clutch pressure Pc1 is applied, is reduced. Controlling the hydraulic pressure that is applied to the pulley such that the belt winding radius R is reduced, described above, is reducing the hydraulic pressure that is applied to the pulley. When both the primary pressure Pin and the secondary pressure Pout are larger than the clutch pressure Pc1, the primary pressure Pin and the secondary pressure Pout are controlled such that both the belt winding radii R are reduced. In this case, absolutely, both the primary pressure Pin and the secondary pressure Pout are reduced. Therefore, not the belt winding radii Rin, Rout of the pulleys 58, 62 both are actually reduced but the belt winding radii Rin, Rout corresponding to the speed gear ratio γ are changed in accordance with the correlation between the primary thrust Win and the secondary thrust Wout according to the reduced primary pressure Pin and the reduced secondary pressure Pout.

Specifically, when at least one of the primary pressure Pin or the secondary pressure Pout is larger than the clutch pressure Pc1, the electronic control unit 70 controls the primary pressure Pin and the secondary pressure Pout to corresponding minimum hydraulic pressures that do not cause a slip of the transmission belt 64 for the input torque Tin to the continuously variable transmission 24 (that is, the hydraulic pressures that provide the primary slip limit thrust Wlmtin and the secondary slip limit thrust Wlmtout). For example, in a state where the primary pressure Pin is set to the hydraulic pressure that provides the primary slip limit thrust Wlmtin and the secondary pressure Pout is set to a value larger than the hydraulic pressure that provides the secondary slip limit thrust Wlmtout, the electronic control unit 70 controls the secondary pressure Pout to the hydraulic pressure that provides the secondary slip limit thrust Wlmtout (see FIG. 6).

However, when both the minimum hydraulic pressures that do not cause a slip of the transmission belt 64 for the input torque Tin to the continuously variable transmission 24 are smaller than the clutch pressure Pc1, the line pressure Pl is not allowed to be reduced in a region in which the primary pressure Pin and the secondary pressure Pout are reduced below the clutch pressure Pc1. Therefore, when both the minimum hydraulic pressures that do not cause a slip of the transmission belt 64 for the input torque Tin to the continuously variable transmission 24 are smaller than the clutch pressure Pc1, the electronic control unit 70 controls the primary pressure Pin and the secondary pressure Pout while setting the clutch pressure Pa as a lower limit hydraulic pressure.

On the other hand, when the clutch pressure Pc1 is larger than any of the primary pressure Pin and the secondary pressure Pout, the electronic control unit 70 controls the primary pressure Pin such that the belt winding radius Rin on the primary pulley 58 is reduced and controls the secondary pressure Pout such that the belt winding radius Rout on the secondary pulley 62 is increased. Specifically, when the clutch pressure Pa is larger than any of the primary pressure Pin and the secondary pressure Pout, the electronic control unit 70 controls the primary pressure Pin and the secondary pressure Pout to hydraulic pressures such that the speed gear ratio γ of the continuously variable transmission 24 is set to the lowest speed gear ratio γmax (that is, the hydraulic pressures that provide the primary thrust Win and the secondary thrust Wout for achieving the lowest speed gear ratio γmax).

More specifically, the electronic control unit 70 further includes hydraulic pressure determination means, that is, a hydraulic pressure determination unit 94. The hydraulic pressure determination unit 94, for example, determines whether a larger one of the target primary pressure Pintgt and the target secondary pressure Pouttgt (or the primary command pressure Pindir and the secondary command pressure Poutdir) in the case where the target speed gear ratio γtgt is set to the lowest speed gear ratio γmax is larger than the target clutch pressure Pc1$tgt$ (or the clutch command pressure Pc1$dir$) in the gear drive mode. The target primary pressure Pintgt and the target secondary pressure Pouttgt (or the primary command pressure Pindir and the secondary command pressure Poutdir) are set by the shift control unit 92. The target clutch pressure Pc1$tgt$ (or the clutch command pressure Pc1$dir$) is set by the shift control unit 92.

When the hydraulic pressure determination unit 94 determines that the larger one of the target primary pressure Pintgt and the target secondary pressure Pouttgt is larger than the target clutch pressure Pc1$tgt$, the shift control unit 92 sets the primary thrust Win to the primary slip limit thrust Wlmtin and sets the secondary thrust Wout to the secondary slip limit thrust Wlmtout. That is, the shift control unit 92 outputs the primary command pressure Pindir and the secondary command pressure Poutdir to the hydraulic control circuit 84. The primary command pressure Pindir provides the primary slip limit thrust Wlmtin. The secondary command pressure Poutdir provides the secondary slip limit thrust Wlmtout. When the target clutch pressure Pc1$tgt$ is larger than any of the hydraulic pressures that provide the primary slip limit thrust Wlmtin and the secondary slip limit thrust Wlmtout, the shift control unit 92 sets the primary command pressure Pindir and the secondary command pressure Poutdir while setting the target clutch pressure Pc1$tgt$ as a lower limit hydraulic pressure. In this control, the shift control unit 92, for example, does not set the target speed gear ratio γtgt of the continuously variable transmission 24, and establishes the speed gear ratio γ according to the primary command pressure Pindir and the secondary command pressure Poutdir.

When the hydraulic pressure determination unit 94 determines that the larger one of the target primary pressure Pintgt and the target secondary pressure Pouttgt is smaller than the target clutch pressure Pc1$tgt$, the shift control unit 92 respectively sets the primary thrust Win and the secondary thrust Wout to the primary thrust Win and the secondary thrust Wout for achieving the lowest speed gear ratio γmax. That is, the shift control unit 92 shifts the speed gear ratio γ to the lowest speed gear ratio γmax or keeps the lowest speed gear ratio γmax by outputting the primary command pressure Pindir and the secondary command pressure Poutdir, which provide the primary thrust Win and the secondary thrust Wout for achieving the lowest speed gear ratio γmax, to the hydraulic control circuit 84. In this control, the shift control unit 92, for example, carries out a shift in feedback control and/or feedforward control in which the lowest speed gear ratio γmax is set for the target speed gear ratio γtgt of the continuously variable transmission 24. In terms of the characteristics of various rotation speed sensors 74, 76, in an extremely low vehicle speed region in which the accuracy of detecting a rotation speed is low, the shift control unit 92, for example, carries out a shift in feedforward control only.

Figure 7:
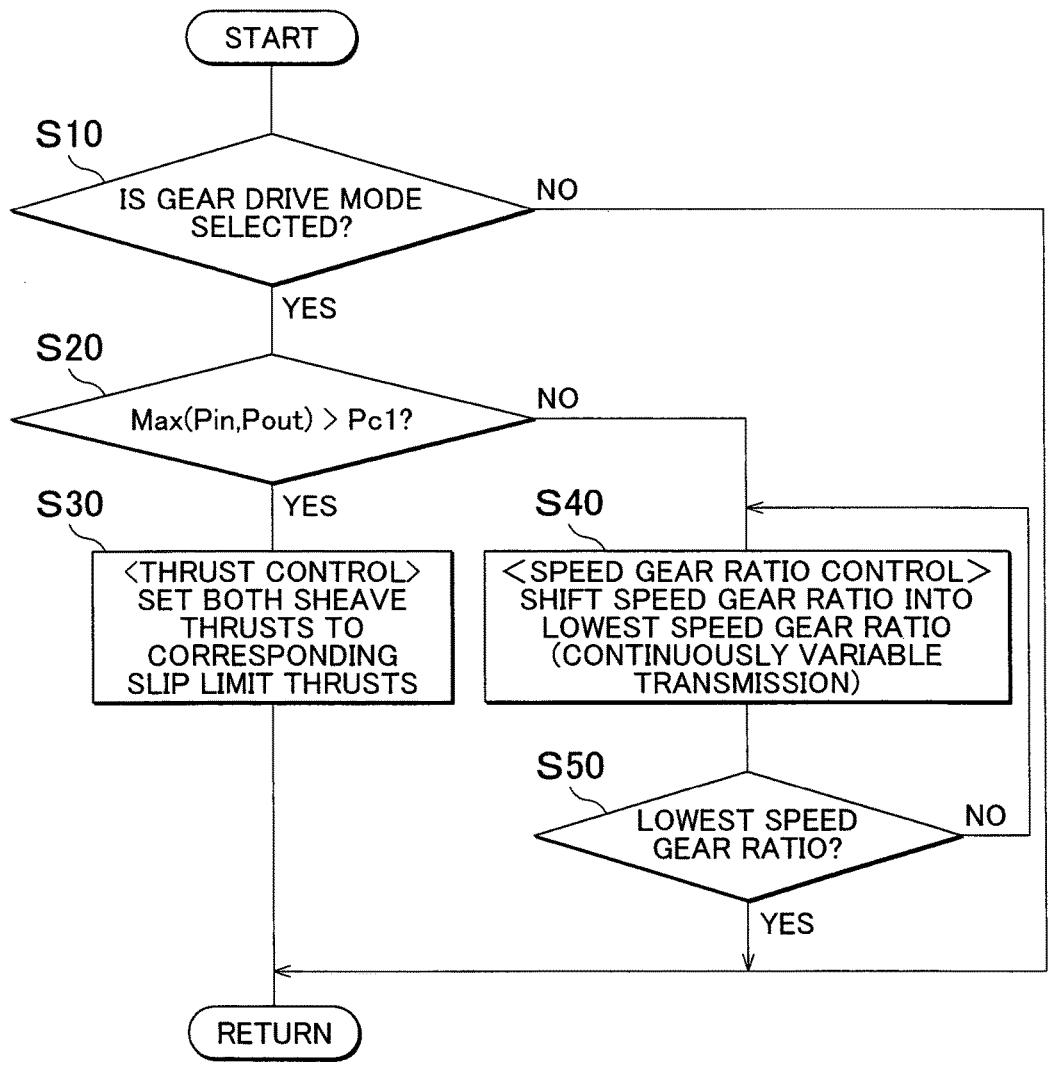
FIG. 7 is a flowchart that illustrates a relevant portion of control operations of an electronic control unit, that is, control operations for improving fuel economy or improving power performance by appropriately controlling an idling continuously variable transmission.

FIG. 7 is a flowchart that illustrates a relevant portion of control operations of the electronic control unit 70, that is, control operations for improving fuel economy or improving power performance by appropriately controlling the idling continuously variable transmission 24. The flowchart is, for example, repeatedly executed at an extremely short cycle time of about several milliseconds to several tens of milliseconds.

In FIG. 7, initially, in step (hereinafter step is omitted) S10 corresponding to the shift control unit 92, for example, it is determined, on the basis of the command signal to the hydraulic control circuit 84, whether the power transmission path of the transmission 17 is the second power transmission path, that is, whether the gear transmission mode is selected. When negative determination is made in S10, the routine is ended. When affirmative determination is made in S10, in S20 corresponding to the hydraulic pressure determination unit 94, for example, it is determined whether a larger one of the target primary pressure Pintgt and the target secondary pressure Pouttgt in the case where the target speed gear ratio γtgt is set to the lowest speed gear ratio γmax is larger than the target clutch pressure Pc1$tgt$ in the gear drive mode. When affirmative determination is made in S20, in S30 corresponding to the shift control unit 92, for example, the thrusts W of the pulleys 58, 62 are respectively set to the primary slip limit thrust Wlmtin and the secondary slip limit thrust Wlmtout. On the other hand, when negative determination is made in S20, in S40 corresponding to the shift control unit 92, for example, the thrusts W of the pulleys 58, 62 are respectively set to the primary thrust Win and the secondary thrust Wout for achieving the lowest speed gear ratio γmax, and the continuously variable transmission 24 is shifted into the lowest speed gear ratio γmax. Subsequently, in S50 corresponding to the shift control unit 92, for example, it is determined whether the speed gear ratio γ of the continuously variable transmission 24 is the lowest speed gear ratio γmax. When negative determination is made in S50, S40 is repeatedly executed. When affirmative determination is made in S50, the routine is ended.

In a transmission including only the power transmission path in which the continuously variable transmission 24 is interposed, for example, in a low vehicle speed region, the primary thrust Win and the secondary thrust Wout for achieving the lowest speed gear ratio γmax (hereinafter, referred to as a γmax corresponding thrust, a γmax keeping thrust, see FIG. 6) are set. In contrast, in the transmission 17 including the first power transmission path in which the continuously variable transmission 24 is interposed and the second power transmission path in which the gear mechanism 28 is interposed, the gear drive mode is allowed to be carried out in a low vehicle speed region. Thus, by executing S30, the effect of improving fuel economy is obtained by the amount of a hydraulic pressure corresponding to the difference between the γmax keeping thrust and the secondary slip limit thrust Wlmtout as shown in FIG. 6. On the other hand, in a region in which the effect of improving fuel economy is not obtained even when the secondary pressure Pout is reduced because the clutch pressure Pc1 is larger than the secondary pressure Pout corresponding to the γmax keeping thrust, the input shaft equivalent inertia Iin is minimized by executing S40, S50. Thus, it is possible to reduce the input shaft inertial loss Tli due to fluctuations in rotation of the input shaft 22 during vehicle acceleration.

As described above, according to the present embodiment, when the line pressure Pl is dominated (determined) by at least one of the primary pressure Pin or the secondary pressure Pout during idling of the continuously variable transmission 24, the effect of improving fuel economy is obtained by reducing the at least one of the primary pressure Pin or the secondary pressure Pout, which is larger than the clutch pressure Pc1. On the other hand, when the line pressure Pl is dominated by the clutch pressure Pc1 during idling of the continuously variable transmission 24, the input shaft equivalent inertia Iin is reduced by controlling the speed gear ratio γ of the continuously variable transmission 24 toward the lowest speed gear ratio γmax. Thus, the input shaft inertial loss Tli due to fluctuations in rotation of the input shaft 22 is reduced, and the power performance of the vehicle 10 is improved. Thus, in the transmission 17 including the continuously variable transmission 24 and the gear mechanism 28 in parallel with each other between the input shaft 22 and the output shaft 30, it is possible to improve fuel economy or improve power performance by appropriately controlling the idling continuously variable transmission 24.

According to the present embodiment, when at least one of the primary pressure Pin or the secondary pressure Pout is larger than the clutch pressure Pc1, the primary pressure Pin and the secondary pressure Pout are controlled to corresponding minimum hydraulic pressures that do not cause a slip of the transmission belt 64 for the input torque Tin to the continuously variable transmission 24. Therefore, the effect of improving fuel economy is appropriately obtained by the amount of the difference between each of the minimum hydraulic pressures that do not cause a slip of the transmission belt 64 and a corresponding one of the primary pressure Pin and the secondary pressure Pout at the time of controlling the speed gear ratio γ of the continuously variable transmission 24 toward the lowest speed gear ratio γmax.

According to the present embodiment, when both the minimum hydraulic pressures that do not cause a slip of the transmission belt 64 for the input torque Tin to the continuously variable transmission 24 are smaller than the clutch pressure Pc1, the primary pressure Pin and the secondary pressure Pout are controlled while the clutch pressure Pc1 is set as a lower limit hydraulic pressure. Therefore, it is possible to reduce the at least one of the hydraulic pressures, which is larger than the clutch pressure Pc1, to a hydraulic pressure within a range in which one of the primary pressure Pin and the secondary pressure Pout is larger than the clutch pressure Pa or a hydraulic pressure substantially equal to the clutch pressure Pc1.

According to the present embodiment, when the clutch pressure Pc1 is larger than any of the primary pressure Pin and the secondary pressure Pout, the primary pressure Pin and the secondary pressure Pout are controlled to hydraulic pressures such that the speed gear ratio γ of the continuously variable transmission 24 is set to the lowest speed gear ratio γmax. Therefore, the input shaft equivalent inertia Iin is minimized, so the power performance of the vehicle 10 is appropriately improved.

The embodiments of the invention are described in detail with reference to the drawings; however, the invention is also applicable to other alternative embodiments.

For example, in the above-described embodiment, the invention is described by mainly using the magnitude correlation between the clutch pressure Pc1 and a larger one of the primary pressure Pin and the secondary pressure Pout. This applies to the case of forward traveling. In the embodiment, as described as (in the case of reverse traveling, the clutch pressure Pb1), the invention is also applicable to the case of reverse traveling.

In the above-described embodiment, the dog clutch D1 is provided in the second power transmission path in which the gear mechanism 28 is interposed. However, the dog clutch D1 does not always need to be provided for implementing the invention.

In the above-described embodiment, the gear mechanism 28 is the transmission mechanism having a single gear stage; however, the gear mechanism 28 is not limited to this configuration. For example, the gear mechanism 28 may be a transmission mechanism having a plurality of gear stages with different speed gear ratios γ. That is, the gear mechanism 28 may be a stepped transmission that is shifted into two or more stages.

In the above-described embodiment, in terms of the speed gear ratio γ, the gear mechanism 28 is the transmission mechanism that establishes the speed gear ratio EL lower than the lowest speed gear ratio γmax of the continuously variable transmission 24; however, the gear mechanism 28 is not limited to this configuration. For example, the gear mechanism 28 may be a transmission mechanism that establishes both a high speed gear ratio EH and the low speed gear ratio EL. The high speed gear ratio EH is higher than the highest speed gear ratio γmin of the continuously variable transmission 24. The invention can also be applied to the thus configured gear mechanism 28. This also applies to the case where the gear mechanism 28 is a transmission mechanism having a plurality of gear stages.

In the above-described embodiment, the driving pattern of the transmission 17 is changed by using the predetermined shift map; however, the invention is not limited to this configuration. For example, the driving pattern of the transmission 17 may be changed by calculating a driver's driving request amount (for example, required torque) on the basis of the vehicle speed V and the accelerator operation amount θacc and then setting a speed gear ratio that satisfies the required torque.

In the above-described embodiment, the engine 12 is illustrated as the driving force source; however, the invention is not limited to this configuration. For example, an internal combustion engine, such as a gasoline engine and a diesel engine, is used as the driving force source. Instead, another prime motor, such as an electric motor, may be employed solely or in combination with the engine 12, as the driving force source. The power of the engine 12 is transmitted to the continuously variable transmission 24 or the gear mechanism 28 via the torque converter 20; however, the invention is not limited to this configuration. For example, instead of the torque converter 20, another fluid transmission device, such as a fluid coupling having no torque amplification function, may be used. Alternatively, the fluid transmission device is not necessarily provided.

The above-described embodiment is only illustrative, and the invention may be implemented in modes including various modifications or improvements on the basis of the knowledge of persons skilled in the art.

The invention claimed is:

1. A control apparatus for a transmission of a vehicle, the transmission including
   a continuously variable transmission mechanism including an input-side pulley, an output-side pulley and a belt, the belt being wound to span between the input-side pulley and the output-side pulley,
   a gear mechanism including one or a plurality of gear stages, the continuously variable transmission mechanism and the gear mechanism being provided in parallel with each other between an input rotating member and an output rotating member, power of a driving force source being transmitted to the input rotating member, the output rotating member being configured to output the power to a drive wheel, and
   a clutch mechanism configured to selectively change a power transmission path between a first path and a second path, the first path being a path through which the power of the driving force source is transmitted via the continuously variable transmission mechanism, the second path being a path through which the power of the driving force source is transmitted via the gear mechanism, the clutch mechanism including a clutch configured to transmit power or interrupt transmission of power in the second path, the control apparatus comprising:
   an electronic control unit configured to
   i) when at least one of an input pulley hydraulic pressure applied to the input-side pulley or an output pulley hydraulic pressure applied to the output-side pulley is larger than a clutch hydraulic pressure applied to the clutch while the cultch is engaged and the power of the driving force source is transmitted through the second path, control the at least one of the input pulley hydraulic pressure or the output pulley hydraulic pressure larger than the clutch hydraulic pressure such that a winding radius of the belt on the at least one of the input-side pulley or the output-side pulley, to which a hydraulic pressure larger than the clutch hydraulic pressure is applied, decreases, and
   ii) when the clutch hydraulic pressure is larger than any of the input pulley hydraulic pressure and the output pulley hydraulic pressure, control the input pulley hydraulic pressure and the output pulley hydraulic pressure such that a winding radius of the belt on the input-side pulley decreases and a winding radius of the belt on the output-side pulley increases.

2. The control apparatus according to claim 1, wherein the electronic control unit is configured to, when at least one of the input pulley hydraulic pressure or the output pulley hydraulic pressure is larger than the clutch hydraulic pressure, control the input pulley hydraulic pressure and the output pulley hydraulic pressure such that the input pulley hydraulic pressure and the output pulley hydraulic pressure become corresponding minimum hydraulic pressures that do not cause a slip of the belt for an input torque to the continuously variable transmission mechanism.

3. The control apparatus according to claim 2, wherein the electronic control unit is configured to, when both the minimum hydraulic pressures that do not cause a slip of the belt for the input torque to the continuously variable transmission mechanism are smaller than the clutch hydraulic pressure, control the input pulley hydraulic pressure and the output pulley hydraulic pressure while setting the clutch hydraulic pressure as a lower limit hydraulic pressure.

4. The control apparatus according to claim 1, wherein the electronic control unit is configured to, when the clutch hydraulic pressure is larger than any of the input pulley hydraulic pressure and the output pulley hydraulic pressure, control the input pulley hydraulic pressure and the output pulley hydraulic pressure such that a speed gear ratio of the continuously variable transmission mechanism becomes a minimum vehicle speed-side speed gear ratio.

5. The control apparatus according to claim 2, wherein the electronic control unit is configured to, when the clutch hydraulic pressure is larger than any of the input pulley hydraulic pressure and the output pulley hydraulic pressure, control the input pulley hydraulic pressure and the output pulley hydraulic pressure such that a speed gear ratio of the continuously variable transmission mechanism becomes a minimum vehicle speed-side speed gear ratio.

6. The control apparatus according to claim 3, wherein the electronic control unit is configured to, when the clutch hydraulic pressure is larger than any of the input pulley hydraulic pressure and the output pulley hydraulic pressure, control the input pulley hydraulic pressure and the output pulley hydraulic pressure such that a speed gear ratio of the continuously variable transmission mechanism becomes a minimum vehicle speed-side speed gear ratio.

* * * * *